United States Patent [19]
Sloan

[11] Patent Number: 5,089,762

[45] Date of Patent: Feb. 18, 1992

[54] BATTERY DISCONNECT DEVICE

[76] Inventor: Jeffrey M. Sloan, 1082 Woodcrest Dr., Flint, Mich. 48504

[21] Appl. No.: 481,894

[22] Filed: Feb. 20, 1990

Related U.S. Application Data

[63] Continuation-in-part of Ser. No. 272,427, Nov. 17, 1988, Pat. No. 4,902,956, which is a continuation-in-part of Ser. No. 940,863, Dec. 12, 1986, abandoned.

[51] Int. Cl.$^5$ .................. H02G 3/00; H02H 7/18; H02J 7/00
[52] U.S. Cl. .................. 320/13; 307/10.7; 320/38; 320/40; 320/48
[58] Field of Search .................. 320/13, 37, 38, 48, 320/40; 307/10.7

[56] References Cited

U.S. PATENT DOCUMENTS

| | | | |
|---|---|---|---|
| 3,852,732 | 12/1974 | Yorksie et al. | 320/48 X |
| 4,017,724 | 4/1977 | Finger | 320/48 X |
| 4,052,717 | 10/1977 | Arnold et al. | 320/48 X |
| 4,180,770 | 12/1979 | Eby | 320/48 X |
| 4,193,026 | 3/1980 | Finger et al. | 324/428 |
| 4,388,618 | 6/1983 | Finger | 320/48 X |
| 4,445,090 | 4/1984 | Melocik et al. | 320/48 X |
| 4,493,001 | 1/1985 | Sheldrake | 320/48 X |

*Primary Examiner*—R. J. Hickey
*Attorney, Agent, or Firm*—Gifford, Groh, Sprinkle, Patmore and Anderson

[57] ABSTRACT

A device for use in conjunction with a battery in a motor which is connected to an electrical load. The device includes a microprocessor which iteratively inputs the value of the battery voltage as well as the ambient temperature surrounding the battery. The microprocessor also sets a cut off voltage level which increases proportionately with elapsed time from the last system reset of the device and preferably adjusts the cut off voltage level as a function of the ambient temperature of the battery. The cut off voltage level is set so that when the battery reaches the cut off voltage, sufficient energy remains in the battery for engine ignition. The microprocessor then iteratively compares the battery voltage signal with the cut off voltage level and generates an output signal whenever the battery voltage is less than or equal to the cut off voltage level. The output signal initiates a timer which counts down a relatively short period of time, for example two minutes. At the end of the two minute period and assuming that a system reset did not occur during the activation of the timer, the device generates a battery disconnect signal which disconnects the battery from the electrical load of the vehicle. In this fashion, the device of the present invention ensures that the battery retains sufficient electrical charge or energy for subsequent vehicle ignition.

10 Claims, 4 Drawing Sheets

BATTERY DISCONNECT DEVICE

CROSS REFERENCE TO RELATED APPLICATIONS

The present application is a continuation-in-part of U.S. patent application Ser. No. 272,427, filed Nov. 17, 1988, entitled SAFETY DEVICE TO PREVENT EXCESSIVE BATTERY DRAIN, now U.S. Letters Pat. No. 4,902,956, which in turn was a continuation-in-part of U.S. patent application Ser. No. 940,863, filed Dec. 12, 1986, entitled SAFETY DEVICE TO PREVENT EXCESSIVE BATTERY DRAIN, now abandoned.

BACKGROUND OF THE INVENTION

I. Field of the Invention

The present invention relates to a battery disconnect device for a vehicle.

II. Description of the Prior Art

Motor vehicles, such as cars, marine vessels, trucks and the like almost universally include a battery which is used for engine ignition. The battery is also electrically connected to other electrical loads in the vehicle, such as hazard lights, radios, running lights, etc. As is well known, when the engine is running, a generator or alternator driven by the engine recharges the battery.

Oftentimes, the battery continues to drive an electrical load in the vehicle even though the engine is off and, in doing so, discharges the battery. In some cases, this can be inadvertent, such as when the vehicle operator leaves the headlights on on the vehicle, or through a malfunction in the electrical circuit. In either event, after a period of time, the battery will discharge to such an extent that engine ignition using the charge in the battery is impossible.

SUMMARY OF THE PRESENT INVENTION

The present invention provides a device which protects the battery from excessive electrical discharge and ensures that a sufficient energy remains in the battery for engine ignition.

In brief, the present invention comprises a microprocessor based circuit which iteratively senses both the battery voltage and preferably the ambient battery temperature. Both the battery voltage and preferably the battery temperature are provided as input signals to the microprocessor.

Each time the engine ignition is activated, the microprocessor senses the engine ignition and the microprocessor, under program control, resets or clears a long term timer. Thereafter, after each termination of engine igition, the microprocessor begins to iteratively inputs the signal indicative of the battery voltage for the vehicle battery. The microprocessor may also input the signal representative of the ambient temperature. Conventional transducers are used to produce both the temperature and the voltage inputs to the microprocessor.

The microprocessor then adjusts a reference voltage level, e.g. 11.8 volts, as a function of elapsed time since last termination of engine ignition and preferably as a function of the ambient temperature to produce a cut off voltage level. Consequently, the cut off voltage level varies as a function of time and preferably temperature of the battery. The microprocessor then iteratively compares the battery voltage signal with the calculated cut off voltage level. In the event that the battery voltage reaches or is less than the cut off level, the microprocessor generates an output signal which initiates a timing means, such as an internal timer in the microprocessor.

The timing means is used to count down a preset period of time, for example two minutes, which is designed to permit the operator sufficient time to start the vehicle. If at the end of the timer countdown period the engine has not been started, the timing means produces a battery disconnect signal. This battery disconnect signal actuates an electromechanical switch which disconnects the battery from the electrical load for the vehicle. Thereafter, the switch can be either electrically or manually reset to enable engine ignition.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
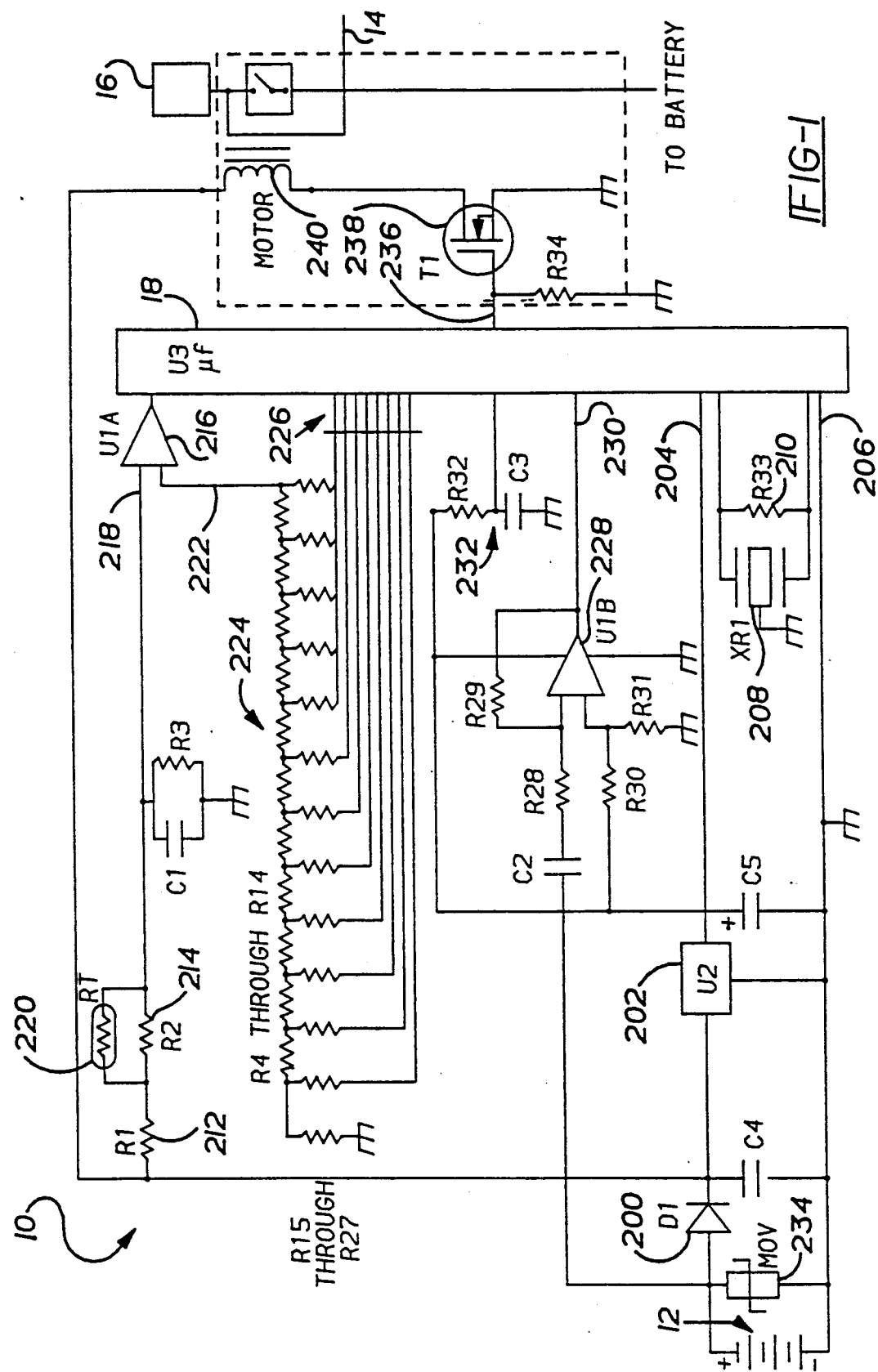
FIG. 1 is a schematic view illustrating a preferred embodiment of the present invention.

With reference first to FIG. 1, a preferred embodiment of the device of a circuit 10 of the present invention is thereshown for use with a battery 12 which is electrically connected through a switch 14 to an electrical load 16. The switch 14 will subsequently be described in greater detail. Additionally, the battery 12 is used with a motor vehicle having an engine, such as an automobile, and the load 16 comprises the electrical components of the vehicle. These electrical components include, for example, headlights, radio, hazard lights and the like.

Still referring to FIG. 1, the circuit 10 includes a microprocessor 18 which operates under control of a computer program. The computer program for driving or controlling the microprocessor 18 will be subsequently described in greater detail. Typically, the computer program is contained in read only memory (ROM) contained in the microprocessor, but external ROM can be alternatively used. Additionally, although the circuit 10 is preferably microprocessor based, it can alternatively be hard wired logic, ASIC technology, discrete components, or the like without deviation from the spirit or scope of the present invention.

Still referring to FIG. 1, the battery 12 is connected through a diode 200 and voltage regulator 202 to the power supply input 204 and 206 of the microprocessor 18. A varister 234 is also connected in parallel across the battery 12 to protect the circuit 10 from voltage spikes.

A crystal 208 and resistor 210 parallel combination are also coupled to a clock input of the microprocessor 18. The crystal 208 and resistor 210 provide the appropriate oscillator frequency to the microprocessor 18 in the conventional fashion.

The positive terminal of the battery 12 is connected through the diode 200 and the voltage disorder network comprising resistors 212, 213, and 214 to one input 218 of a voltage comparator 216. The output of the voltage comparator 216 is coupled as an input signal to the microprocessor 18. Additionally, a thermister 220, which varies in resistance as a function of the temperature of the thermister, is connected in parallel to the resistor 214. Consequently, a voltage signal representative of the voltage of the battery 12 as modified by the temperature of the thermister 220 is connected as an input signal to the comparator 216. However, even in the event that the thermister 220 completely fails, a voltage signal representative of the battery voltage 212 is connected as an input signal to the comparator 216.

The other input 222 to the voltage comparator 216 is coupled to one side of a resistor network 224 while the other side of the resistor network 224 is coupled to discrete output ports 226 of the microprocessor 18. The microprocessor 18, by providing different digital signals on the port 226, varies the voltage level at the comparator input 222 and, accordingly, varies the threshold voltage level at which the output of the comparator 216 switches. As it will become subsequently described in greater detail, the digital outputs on the microprocessor ports 226 vary under control of the microprocessor program to provide a variable voltage threshold signal to the voltage comparator 216.

Still referring to FIG. 1, the battery 12, which is connected to the electrical system of the vehicle, is also coupled as an input signal to an operational amplifier 228 having its output connected to an input line 230 of the microprocessor 18. The operational amplifier 228 detects and amplifies any noise that may be present on the electrical system of the vehicle. Such noise is indicative of an engine running condition and/or operation of the hazard lights for the motor vehicle. In either event, the output from the operational amplifier 228 serves to disable operation of the battery disconnect routines contained in the microprocessor 18.

A resistor and capacitor combination 232 is also coupled to the power reset input of the microprocessor 18 to provide orderly startup of the microprocessor 18. Such power resets are conventional and well known so that a further description thereof is unnecessary.

The microprocessor 18 also has an output line 236 connected to the gate of a FET transistor 238. In this event, the presence of a signal on the output line 236 causes the FET 238 to conduit which drives a DC servomotor 86. The motor 240 opens the switch 14 and disconnects the load 16 from the battery 12 in a manner to be subsequently described.

Figure 2:
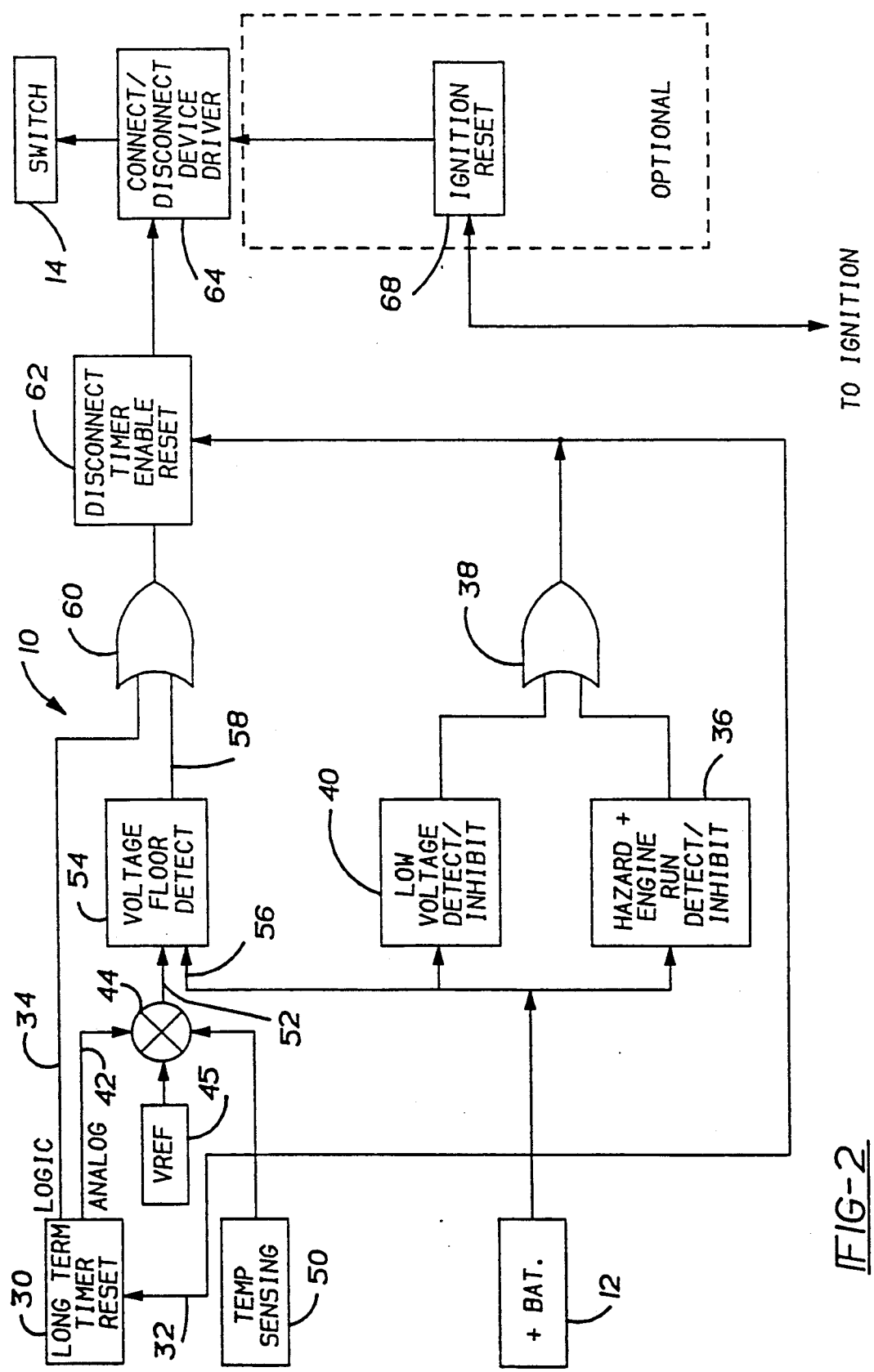
FIG. 2 is a block diagrammatic view illustrating the preferred embodiment of the present invention.

With reference now to FIG. 2, a block diagram of the circuit 10 is thereshown. The block diagram shown in FIG. 2 corresponds to the circuit shown in FIG. 1, but illustrates the circuit in functional blocks, some of which are software based. A long term timer 30, preferably a software timer, is initiated each time a reset signal is received on its reset input 32. This long term timer 30 counts down a relatively long time period, for example six weeks, before it generates an output signal on its output line 34. The output line 34 in turn activates or starts a short term timer 62 which counts down a relatively short period, e.g. two minutes, before it generates a signal on its output line 63. The signal on line 62 disconnects the battery 12 from the load 16 as will be subsequently described in greater detail.

A high voltage detect/reset block 31 detects the presence of a high battery voltage, e.g. 13.6 volts, which is indicative both of an engine run condition and an operative charging system. Once the high voltage is detected, the block 31 resets both the long term timer 30 and short term timer 62.

Still referring to FIG. 2, the short term timer 62 is continuously reset whenever the engine is running, or when hazard lights on the vehicle are in operation. In either, disconnection of the battery 12 is not desired even though continued connection of the battery, for example during operation of the hazard lights, will deplete the engine battery. To achieve this, the circuit 10 includes a block 36 (operational amplifier 228 in FIG. 1) which detects the presence of the engine running or the operation of the hazard lights. Although any conventional circuitry can be used, preferably the microprocessor 18 is programmed to detect unique patterns of noise on the electrical system for the vehicle which would be indicative of either engine or hazard light operation. Such excessive noise would be indicative of either operation of the engine or operation of the vehicular hazard lights. In either event, the block 36 generates an output signal through an OR gate 38 to the reset input of the short term timer 62.

The circuit 10 also includes a low voltage detect block 40 which compares the value of the battery voltage on line 42 to a preset low value, for example nine volts. Such a low voltage condition would be indicative of a short circuit condition of the vehicle battery. In this event, any attempt to disconnect the battery during such high current flow would cause arcing of the contacts in the switch 14 and perhaps weld the contacts of the switch 14 together. Consequently, during such a low voltage condition, the circuit block 40 generates a signal through the OR gate 38 to the reset line of the short term timer 62. This reset signal from either the circuit blocks 36 or the circuit block 40 effectively disables the short term timer 62 which in turn inhibits disconnection of the battery 12 from the electrical load 16 as will be subsequently described.

With the circuit shown in FIG. 1, the low voltage detect of circuit block 40 as well as the high voltage detect of block 31 is achieved by the microprocessor 18 outputting a digital signal on the port 226 that effectively compares the battery voltage to a very low or high voltage, e.g nine volts or 13.8 volts respectively. The output from the compartor 216 then indicates the presence, or absence, of the low voltage signal or of the high voltage signal.

Figure 3:
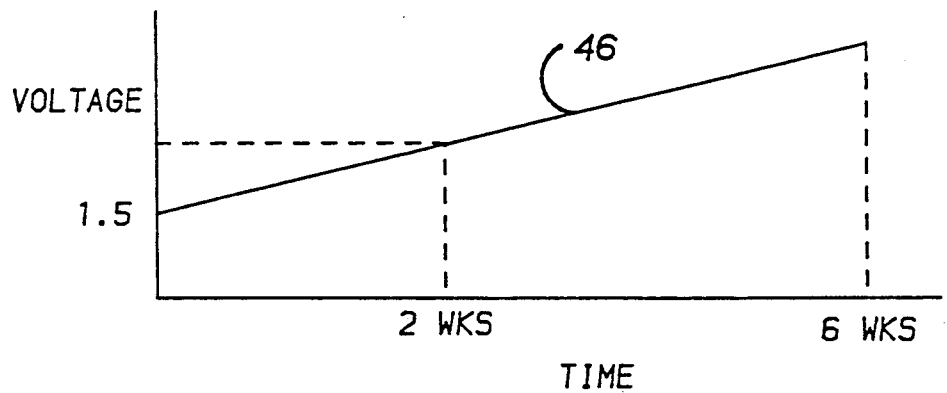
FIG. 3 is a graph illustrating the effect upon lapsed time on the battery cut off level.

With reference now to FIGS. 2 and 3, the long term timer 30 also generates a second signal on its output line 42 to a voltage summing junction 44. The output on line 42 increases proportionately with time as shown in FIG. 3. In practice, the microprocessor achieves the varying voltage threshold of FIG. 3 by changing the outputs of the microprocessor ports 226 as a function of time. This, in turn, varies the particular resistors in the network 224 which are connected to the comparator 216 thereby varying the effective voltage at which the comparative 216 switches.

The summing block 44 also receives an input value from block 45 equal to a preset constant voltage level $V_{REF}$. In the preferred embodiment, this value $V_{REF}$ is software based and equals 11.8 volts scoled down by the same ratio.

Figure 4:
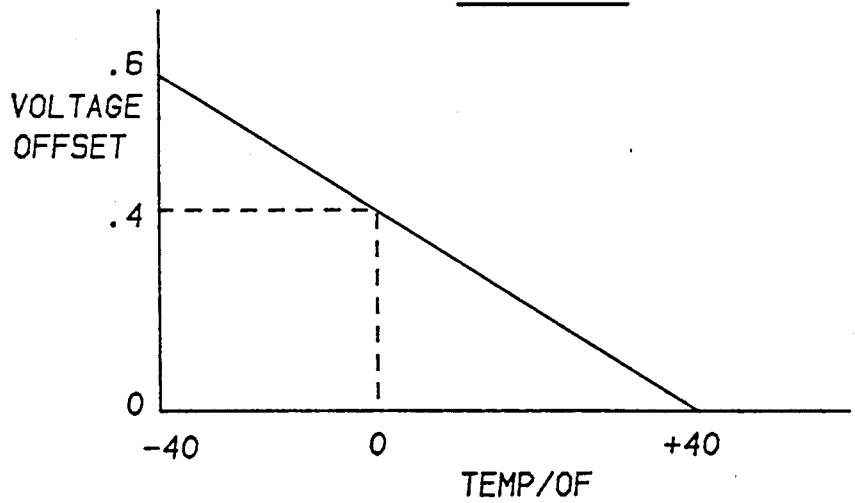
FIG. 4 is a graph similar to FIG. 3 but illustrating the effect upon the battery cut off level resulting from the temperature of the battery.

Lastly, a second summing block 47 receives a voltage offset signal from both the battery 12 and a temperature sensing block 50 or thermister 220 (FIG. 1) in accordance with the voltage offset versus temperature graph illustrated in FIG. 4. Thus, as shown in FIG. 4, at a temperature of 0-F., the temperature sensing block 50 outputs a voltage equal to 0.4 volts to the summing junction 45. Furthermore, as is clear from the graph of FIG. 4, the voltage output from the temperature sensing block 50 varies inversely proportional to the temperature of the battery.

A cut off voltage level is then produced as an output 52 from the voltage summing junction 44 and this cut off voltage output 52 is coupled as an input signal to a voltage comparator circuit 54 or comparator 216 (FIG. 1). The voltage comparator circuit 54 also receives a signal from the second summing junction 47 on a second input line 56 indicative of the current battery voltage as modified by the temperature sensing block 50. The voltage comparator circuit 54 then compares the calculated cut off voltage from line 52 , i.e. the voltage on line 222 as provided by the resistor network 224 and microprocessor ports 226, with the current battery voltage. In the event that the current battery voltage 56 is less than the calculated cut off voltage on line 52, the voltage comparator circuit 54 (comparator 216) generates an output signal on its output 58, through an OR gate 60 to a software short term timer 62. A second input of the OR gate 60 is connected to the output 34 from the long term timer 32. Thus, in the event that the battery voltage falls below the calculated cut off voltage level on line 52, or in the event that no engine ignition occurs at the expiration of the long term timer, preferably about six weeks, the OR gate 60 generates an enabling output signal to the short term timer 62.

The short term timer 62, once initiated by the output from the OR gate 60, down counts a relatively short time period for example two minutes. This relatively short time period is designed to permit the operator to initiate engine ignition even though initial cranking of the engine lowers the battery voltage below the voltage battery cut off level as established on line 52 (FIG. 2). Such a voltage drop is typical during engine cranking due to the large current draw from the battery.

An alarm (not shown) can also be activated when the short term timer 62 is initiated. This alarm would thus alert the user, if present, of the condition of the battery prior to disconnect so that the operator could avert battery disconnect by starting the engine.

In the event that, following expiration of the short term timer 62 and assuming that engine ignition has not occurred, the short term timer 62 generates an output signal to a disconnect driver circuit 64, i.e. the FET 238 and DC motor 240 of FIG. 1. This circuit 64 in turn activates the switch 14 and disconnects the battery 12 from the electrical load 16.

The output 34 from the long term timer 30 also enables the circuit 10 of the present invention to effectively disconnect the engine battery 12 from the electrical load 16 in the event that the vehicle remains unused for a long period of time, for example six weeks. In effect, the device of the present invention places the battery in a storage mode under such non-use conditions. Furthermore, such disconnection of the battery occurs in this event regardless of the battery voltage of the battery 12.

Still referring to FIG. 2, in one form of the invention, following disconnection of the battery by the switch 14, the device of the present invention must be manually reset (as will be subsequently described) in order to reconnect the battery to the electrical system of the vehicle. In a second embodiment of the invention, however, an ignition detection circuit block 68 detects activation of the engine ignition system and actuates the switch 14 through the driver 64 and to thereby close the switch 14. The ignition activation signal is also provided on input line 27 to the microprocessor 18 (FIG. 1). Thus, in this latter case, the device automatically resets following actuation of the engine ignition system.

Figure 5:
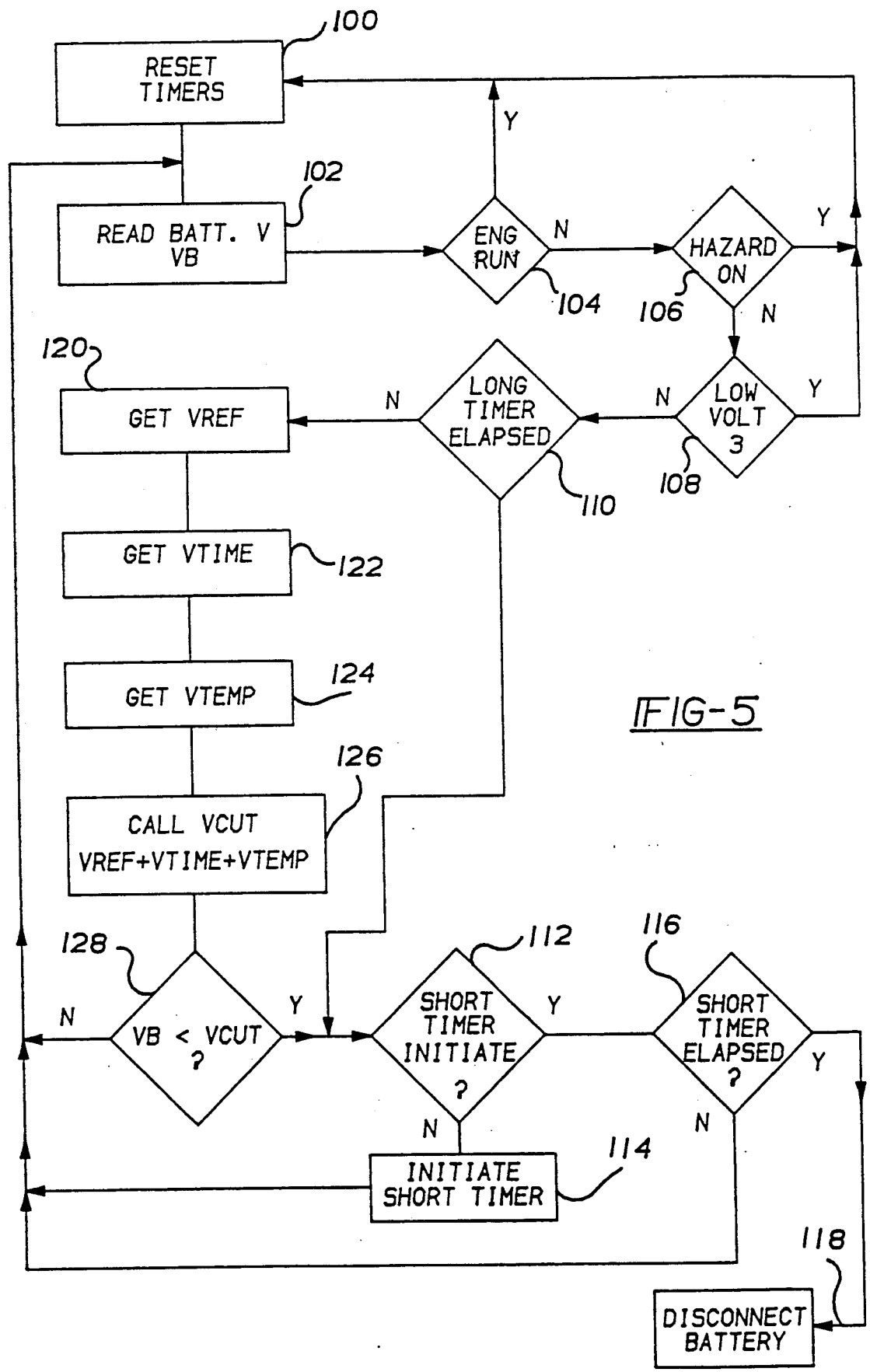
FIG. 5 is a flow chart illustrating the operation of the present invention.

With reference now to FIG. 5, a flow chart illustrating a preferred embodiment of the computer program for the microprocessor 18 is thereshown. The system begins at step 100 at which both a long term and short term timer are reset. Step 100 also resets other variables used in the computer program.

Following system reset at step 100, step 100 branches to step 102 where the battery voltage is continuously modified by the thermister 220 read and stored as variable VB. Step 102 then branches to step 104.

At step 104 the program determines whether or not the engine is running. In the event of a engine run condition, step 104 branches to step 102 and the above process is repeated. Assuming that the engine is not running, step 104 instead branches to step 106 which determines if the vehicle hazard lights are on or not. If the hazard lights are on, step 106 also branches to step 102 where the above process is repeated.

Both steps 104 and 106 can use any means to determine whether the engine is running or whether the engine hazard lights are on. However, in the preferred embodiment of the invention, the computer program detects electrical noise on the electrical system indicative of an engine run or a hazard light operation to determine these conditions.

Assuming that the hazard lights are off, step 106 then branches to step 108 which determines whether a very low voltage condition, for example nine volts, is present. This low voltage level is substantially less than the cut off voltage level and would be indicative of a battery short condition. In this event, step 108 branches to step 102 to prevent arcing and damage to the switch 14 as previously described.

Assuming that step 108 does not detect a very low voltage condition, step 108 branches to step 110 which determines whether the long term timer 30 has elapsed. If so, step 110 branches to step 112 which determines if the short term timer in circuit 62 has been initiated. If not, step 112 branches to step 114 which initiates the short term timer and then branches to step 125 which checks for a high voltage battery condition indicative of a charged battery. If present, step 125 brances to step 100 which resets the long term and short term timers. Otherwise, step 125 branches to step 102 where the above process is repeated.

After initiation of the short term timer in circuit block 62, step 112 will instead branch to step 116 which determines if the short term timer has elapsed. If not, step 116 branches back to step 102 through step 125. Upon expiration of the time for the short term timer, step 116 will branch to step 118 to disconnect the battery 12 from its load 16 by actuation of the disconnect driver 64 (FIG. 2).

Assuming, on the other hand, that the long term timer has not elapsed, step 110 branches to step 120 which reads the preset voltage level $V_{REF}$. This voltage level is scaled, preset, software based and preferably would correspond to a battery voltage of 11.8 volts. Step 120 then branches to step 122 where the voltage offset $V_{TIME}$ due to the elapsed time in accordance with the graph 46 in FIG. 3 is determined. Step 122 then branches to step 126.

Step 126, which corresponds to the summing junction 44 in FIG. 2, then calculates the cut-off voltage $V_{CUT}$ by adding $V_{REF}$ and $V_{TIME}$ together and generates a signal on the microprocessor ports 226 representative of this value. Step 126 then branches to step 128 which compares the cut off voltage $V_{CUT}$ to the current battery voltage VB by reading the output from the comparator 216. If the battery voltage exceeds the cut off voltage $V_{CUT}$, indicative that more than sufficient battery capacity remains for subsequent engine ignition, step 128 branches to step 125 which compares the battery voltage to a high voltage valve, e.g. 13.6 volts, indicative of a fully charged battery. If the battery voltage is greater than 13.6 volts, step 125 brances to step 100 which resets the long term timers. Otherwise, step 125 branches to step 102 where the above described process is repeated.

Conversely, if the battery voltage VB is less than the cut off voltage $V_{CUT}$, indicative that the battery has just sufficient energy capacity for subsequent engine ignition, step 128 branches to step 112 where the short term timer is initiated. Steps 112, 114, 116 and 118 then initiate the short term timer in the fashion previously described to impose a time delay, e.g. two minutes, between the time that the battery voltage falls below the battery cut off level and the time that the battery disconnection actually occurs in order to permit engine ignition. Unless ignition occurs within that time period, however, the battery 12 will be disconnected by the switch 14 from the load 16 in the previously described fashion.

From the foregoing, it can be seen that the disconnect device of the present invention provides a variable voltage cut off which varies as a function not only of elapsed time since the last engine reset but also as a function of the temperature of the battery. The voltage cut off level is set, however, such that at the time of battery disconnection, enough energy or battery capacity remains within the battery for a subsequent engine ignition. Thus, even following battery diconnect, the circuit 10 can be reset, either manually or electrically and engine ignition can still occur.

Figure 6:
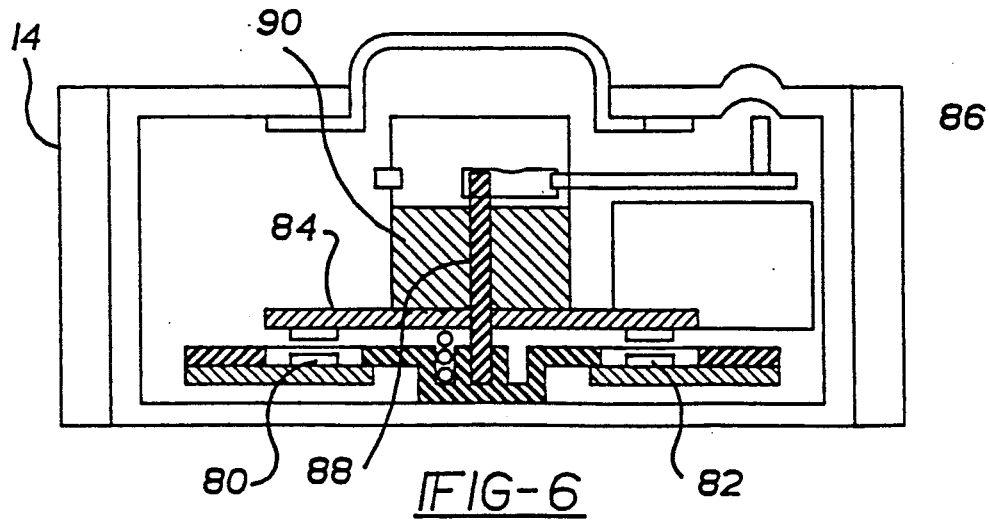
FIG. 6 is a top plan view illustrating a preferred embodiment of the present invention and with parts removed for clarity.

With reference now to FIG. 6, an exemplary switch 14 for electrically connecting and disconnecting the battery 12 from the load 16 is thereshown and comprises a pair of electrical contacts 80 and 82 and an electrical contact plate 84. The electrical contact plate 84, when moved into abutment with electrical contacts 80 and 82, electrically connects the battery 12 to the load 16. Conversely, when the plate 84 is moved out of engagement with the contacts 80 and 82, the battery 12 is electrically disconnected from its load 16.

In order to open and close the switch 14, the DC motor 86 rotatably drives a shaft 88 threadably coupled by a nut 90 to the contact plate 84. Thus, when the motor 86 drives the shaft in one direction, the nut 90 with its attached contact plate 84 is moved out of engagement from the contacts 80 and 82 to thereby open the switch 14. Conversely, when the motor 86 is driven in the opposite rotational direction, such as would occur during a signal from the engine reset circuit block 68 (FIG. 2), the contact plate 84 is moved into engagement with the circuit 80 and 82 thereby closing the switch 14. Preferably, the connection between the nut 90 and the shaft 88 is a slip connection so that the nut 90 can be manually reset by simply manually depressing the nut 90 with its attached contactor plate 84.

With reference then to FIGS. 2 and 6, when the short term time 62 generates an output signal to the disconnect driver circuit 64, indictative that battery disconnect is desired, the driver circuit 64 activates the motor 86 so that the motor shaft rotates in one direction. In doing so, the motor 86 separates the contact plate 84 from the contacts 80 and 82 and disconnects the battery 12 from the load 16.

Conversely, when the engine reset circuit block 68 (if present) generates a signal to the driver circuit 64, the driver circuit 64 activates the motor so that the motor shaft in the opposite rotational direction. In doing so, the contact plate 84 is moved into contact with the contacts 80 and 82 thus reconnecting the battery 12 with the load 16.

Alternatively, an electronic switch 14, such as a MOSFET, can be used.

Since the battery voltage drop with respect to time is proportional to the rate of battery discharge (change in voltage over time) and since the rate of discharge is proportional to the remaining battery capacity, the voltage cut off level $V_{CUT}$ is representative of the remaining energy capacity of the battery. Furthermore, $V_{CUT}$ is adjusted as a function of time and preferably ambient temperature so that, at the point of battery disconnect, enough energy remains in the battery for engine ignition.

The disconnect device of the present invention accounts for the battery rate of the discharge as indicated by change of voltage over time, since the rate of discharge varies automatically or inherently as a function of the battery temperature during discharge, the age of the battery, the battery rated capacity and the load on the battery.

The device can also include a manual override if desired.

In an alternate embodiment of the invention, the electrical load comprises at least two separate banks of electrical loads or accessories. In this case, the device compares the battery voltage with at least two separate cut off voltages, each of which varies as a function of time.

When the battery voltage falls below the first cut off level a timer is initiated and, unless an engine operation signal occurs, i.e. engine ignition, engine crank or engine running, within a preset time period, a disconnect signal is generated which electrically disconnects the battery from the first bank of accessories. Similarly, when the battery voltage falls below the second cut off voltage, the timer is again initiated and, unless an engine operation signal occurs within a preset time period, a second disconnect signal is generated which electrically disconnects the battery from the second bank of accessories. Three or more banks of accessories can be used, each with a different cut off voltage level.

From the foregoing, it can be seen that the present invention provides a simple and yet effective means for monitoring the battery voltage indicative of remaining battery energy of a vehicular battery and then disconnecting the battery from the load as a function of elapsed time since the last engine ignition as well as a function of the battery temperature.

Having described my invention, however, many modifications thereto will become apparent to those skilled in the art to which it pertains without deviation from the spirit of the invention as defined by the scope of the appended claims.

I claim:

1. A device for use in conjunction with a battery electrically connected to an electrical system for an engine having an electrical ignition system comprising:
   means for producing a reset signal indicative of engine operation,
   means for generating a battery voltage signal representative of the voltage of the battery,
   means for setting a cut off voltage level as a function of elapsed time from the last generated reset signal,
   means for iteratively comparing said battery voltage signal with said cut off voltage level and for generating an output signal whenever said battery voltage signal is less than said cut off voltage level,
   a timing means,
   means responsive to said output signal for initiating said timing means, said timing means producing a battery disconnect signal a time period following initiation unless said reset signal occurs during said time period,
   means responsive to said battery disconnect signal for electrically disconnecting said battery from said load.

2. The invention as defined in claim 1 and comprising means for varying one of said battery voltage signal or said cut off voltage level as a function of temperature.

3. The invention as defined in claim 1 wherein said device comprises a preprogrammed microprocessor.

4. The invention as defined in claim 1 wherein said disconnecting means comprises a switch means.

5. The invention as defined in claim 4 wherein said switch means comprises:
   two switch contact plates,
   means for urging said contact plates apart from each other,
   latch means for holding said contact plates together, and
   means responsive to said disconnect signal for releasing said latch means.

6. The invention as defined in claim 4 wherein said releasing means comprises a motor.

7. The invention as defined in claim 2 wherein said means for setting said cut off voltage level comprises means for increasing the cut off voltage level proportionately with elapsed time from the last reset signal and for varying said battery voltage level as a function of said temperature signal.

8. The invention as defined in claim 1 wherein said electrical system includes hazard lights and wherein activation of said hazard lights produces a reset signal.

9. The invention as defined in claim 1 and comprising means for comparing said battery voltage signal with a preset low voltage level, said low voltage level being substantially less than said cut off voltage level, and for generating a reset signal whenever said battery voltage level falls below said low voltage level.

10. The invention as defined in claim 6 and comprising means responsive to a battery disconnect signal and an activation of said ignition system for activating said motor to move said switch contact plates into engagement with each other.

* * * * *